SELECTIVE SOLVENT EXTRACTION OF PETROLEUM

Original Filed Aug. 17, 1937 2 Sheets-Sheet 1

Inventors
JOHN Q. COPE
WILLIAM H. CLAUSSEN
By J. Adams
Attorney

SELECTIVE SOLVENT EXTRACTION OF PETROLEUM

Original Filed Aug. 17, 1937 2 Sheets-Sheet 2

Inventors
JOHN Q. COPE
WILLIAM H. CLAUSSEN
By J. R. Adams
Attorney

Reissued Jan. 12, 1954 Re. 23,768

UNITED STATES PATENT OFFICE 23,768

SELECTIVE SOLVENT EXTRACTION OF PETROLEUM

John Q. Cope, El Cerrito, and William H. Claussen, Berkeley, Calif., assignors, by mesne assignments, to California Research Corporation, San Francisco, Calif., a corporation of Delaware Original No. 2,215,915, dated September 24, 1940, Serial No. 159,522, August 17, 1937. Application for reissue April 9, 1953, Serial No. 347,860

8 Claims. (Cl. 196—14.41)

Matter enclosed in heavy brackets [ ] appears in the original patent but forms no part of this reissue specification; matter printed in italics indicates the additions made by reissue.

This invention relates to a process of refining petroleum with a selective solvent. More particularly, it involves a process of treating normally liquid petroleum hydrocarbons in vapor phase with a liquid phase selective solvent to effect a more efficient separation of the hydrocarbon components into fractions of different chemical types.

As is well known, normally liquid petroleum contains a complex mixture of hydrocarbons of different types. For example, certain natural petroleums are known to contain a minor percentage of aromatic hydrocarbons and a major proportion of paraffins and/or naphthenes having five, six and seven carbon atoms in the naphthene ring. Because of close similarity in properties it has been very difficult to separate these hydrocarbons according to their chemical types. Liquid phase extraction of petroleum oils with selective solvents at temperatures substantially below the point at which the solvent is completely miscible with the oils, constitutes one known method of refining petroleum and separating aromatic and/or naphthenic hydrocarbons from the remaining oil. Although such a process produces an extract containing relatively more aromatic and/or naphthenic hydrocarbons and a raffinate relatively more paraffinic in nature, the separation is only qualitative and yields fractions containing substantial quantities of hydrocarbons which it was desired to eliminate.

It is a well accepted general rule in the art of selective solvent refining that an increase in the temperature of extraction, although it increases the yield of extract obtained, decreases the selectivity of a given solvent and yields an extract in which the separation betwen aromatics and/or naphthenes on the one hand and paraffins on the other hand is less sharp than obtained at lower temperatures. That is, as temperature of extraction is increased, the yield of raffinate is lowered and the extract contains more and more of the hydrocarbons which it is desired to keep in the raffinate. When the temperature of extraction is lowered, the yield of raffinate increases but it contains an increased amount of the type of hydrocarbons (e. g., aromatic and/or naphthenic) which it is desired to retain in the extract. Accordingly, it has heretofore been regarded as necessary to adopt a temperature intermediate the above mentioned high and low extremes such that a given solvent will yield a satisfactory quantity of raffinate and yet also give a reasonably efficient separation or refinement of the petroleum oils.

We have discovered that by increasing the temperature of extraction to the boiling point of the hydrocarbons being extracted, a remarkable and unpredictable reversal in the effectiveness and selectivity of the solvent extraction process is produced.

Accordingly, an object of the present invention is to provide a simple, effective and improved process of refining petroleum with a selective solvent.

Another object is to provide a process of refining petroleum with a selective solvent by counter currently contacting a normally liquid petroleum fraction with a liquid phase selective solvent having a preferential solvent action for one class of carbon compounds such as aromatics, at a temperature no lower than the initial boiling point of said petroleum fraction under the conditions of extraction and preferably no lower than the dew point of the petroleum fraction.

A further object is to provide a single multistage extraction process for continuously separating petroleum into a plurality of separate portions comprising a fraction highly aromatic in character, a fraction containing a high content of the sulfur bodies present in the petroleum, a fraction highly naphthenic in character and a fraction consisting of highly paraffinic compounds.

Another object is to provide a process of selective solvent extraction capable of effecting substantially quantitative separation of aromatic and/or naphthenic hydrocarbons from a normally liquid fraction of natural petroleum containing paraffinic compounds having boiling points as much as 20° to 60° F. higher than the lowest boiling aromatic compound present.

An additional object of the invention is to provide a process capable of effecting quantitative separation of aromatics from a fraction of natural petroleum containing a minor proportion of hydrocarbons of the aromatic type.

A further object of the invention is to provide improved selective solvents for extraction of petroleum.

Briefly, the process of this invention involves counter currently contacting normally liquid petroleum hydrocarbons with a higher boiling selective solvent maintained in liquid phase and at a temperature above the boiling point of the hydrocarbons being treated. By this process aromatic hydrocarbons, or when desired naphthenic hydrocarbons, or both, are selectively extracted from the mixed vapor phase petroleum hydrocarbons.

Figure 1:
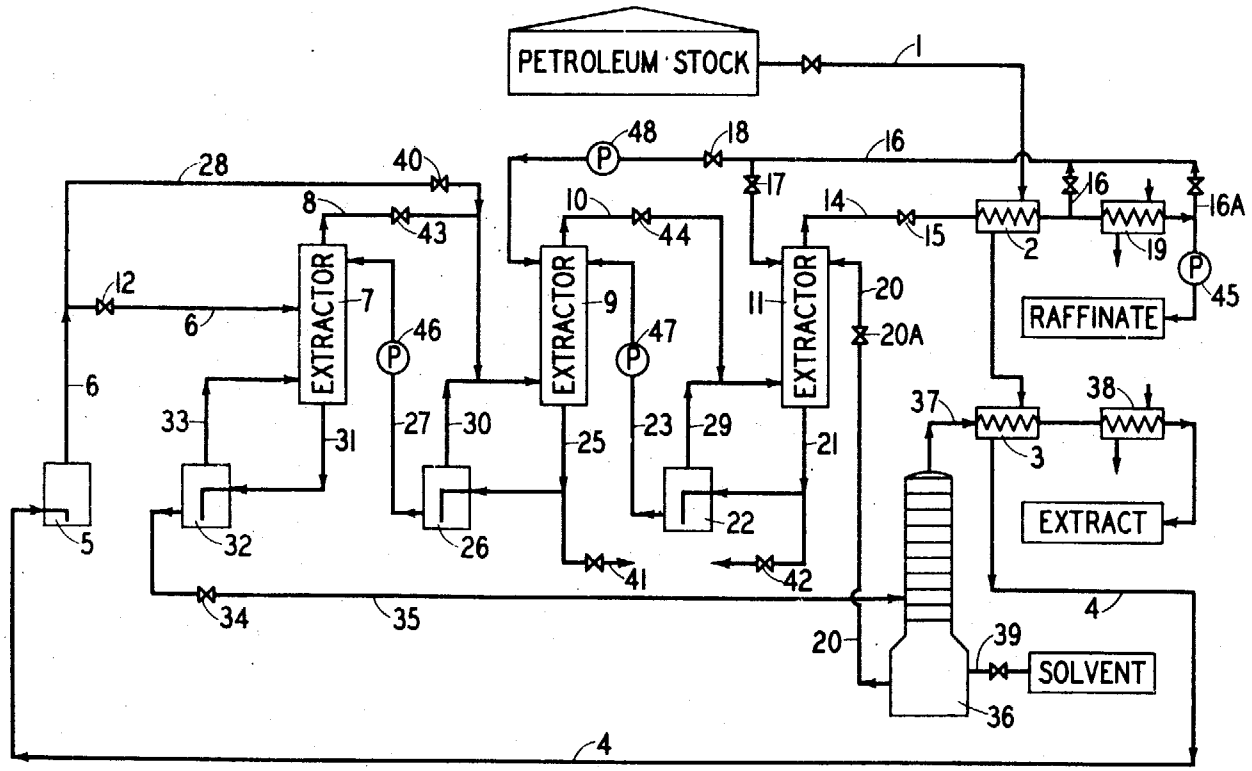
Fig. 1 is a diagrammatic flow sheet illustrating a multi-stage vapor phase selective solvent extraction process embodying the principles of this invention.

In the process as illustrated by the flow sheet of Fig. 1, the petroleum stock to be treated is passed from storage through pipe 1, heat exchangers 2 and 3, and conduit 4 to the vaporizer 5. The petroleum is converted from liquid to vapor phase in the vaporizer 5 and then passes through line 6 and valve 12 to extracting column 7.

To insure intimate contacting in the extraction column between the vapor phase petroleum and the liquid phase selective solvent, various means may be adopted. A tower filled with suitable packing of refractory earthenware, glass, etc., comprises one effective form of apparatus for this purpose. A tower constructed in the same manner as an ordinary fractionating column of a bubble cap type is also an efficient means of insuring effective contact between the vapor phase petroleum and the liquid phase extracting solvent. In Fig. 1, three extraction columns are shown but it is apparent that the number may be increased or decreased as conditions such as efficiency of the extraction, the volumn of materials to be treated, etc., require.

After extraction in tower 7 the raffinate vapors pass from the top of the tower through line 8 to the bottom of extraction tower 9. The raffinate from extraction tower 9 likewise passes through line 10 to tower 11 where the raffinate hydrocarbons, still in vapor phase, are again extracted by the selective solvent. The final vapor phase raffinate flows from the top of extraction tower 11 through conduit 14 and control valve 15 to heat exchanger 2 where partial condensation occurs. Provision is made for returning a portion or all of the partial condensate from heat exchanger 2 through valve controlled line 16 to either extraction tower 9 or 11 or both by means of independent return pipes controlled by valves 17 and 18 therein. The remaining raffinate is cooled in condenser 19, condensed to liquid phase and passed to storage. Valve controlled conduit 16A provides means for supplying additional condensate for reflux when the desired reflux ratio is higher than that obtainable by using the partial condensate alone.

The selective solvent which has been referred to in the previous paragraphs, flows through extraction columns 7, 9 and 11 counter currently to the vapor phase petroleum being extracted. Fresh solvent is admitted to the top of tower 11 through inlet line 20 controlled by valve 20A. The solvent flows down through the column and extracts those hydrocarbons for which it has a selective action from the upwardly flowing vapor phase petroleum. The solvent with the selectively dissolved petroleum vapors is continuously removed from the bottom of the column through line 21 to vaporizer 22. To obtain more efficient extraction it is desirable to heat the solvent in a vaporizer such as 22 in order to vaporize a substantial proportion of the dissolved hydrocarbons and re-circulate these vapors to the extraction column. This procedure tends to eliminate hydrocarbons of the raffinate type which have condensed or which have been dissolved in the solvent. Also, the re-circulation of these vapors provides a method of adding heat to tower 11.

The solvent, after being heated in vaporizer 22, flows through line 23 into the top of extraction tower 9. The solvent then counter currently extracts petroleum vapors in tower 9 and flows through line 25, heater 26 and line 27 to the top of tower 7 in the same manner as in the previously described extraction step. From the bottom of extraction tower 7 the solvent together with the dissolved hydrocarbons is removed through line 31 to vaporizer 32 where a small portion of the dissolved hydrocarbons is vaporized and returned to the extraction tower 7 through line 33. The selective solvent and extract then flow from the vaporizer 32 through valve 34 and line 35 to fractionating still 36. The extracted hydrocarbons are separated from the selective solvent by distillation and are removed from the top of the fractionating column through line 37, passed through heat exchanger 3 and condenser 38 to storage.

The solvent is continuously re-circulated from still 36 through line 20 to the extracting system as previously described. New or additional solvent can be supplied to the system as needed through valve controlled line 39 from the solvent storage tanks. It is to be noted at this point that the solvent entering the extraction system from the still 36 is heated to a temperature above the boiling point of both the extract and raffinate. The temperature of the solvent in the extraction towers must of course be maintained below that at which a major proportion of the extract would be vaporized from or remain undissolved in the solvent while being extracted. This temperature is, however, above the normal dew point of the extract as well as of the raffinate hydrocarbons at the pressure existing in the system.

An auxiliary line 28 leading from vaporizer 5 and a control valve 40 are provided so that the petroleum vapors may be introduced into extraction tower 9 rather than into extraction tower 7. When the vapors are so introduced, control valve 40 will be open and valve 12 in vapor line 6 will be closed. It is also apparent that the incoming hydrocarbon vapors may be introduced in both towers 7 and 9 by opening both valves 40 and 12.

Under various conditions it is desirable to remove side streams or cuts from the extracts of the different stages of extraction. Accordingly, valve controlled conduits 41 and 42 have been provided for this purpose and permit the removal of extract cuts from extractors 9 and 11 respectively. The portions of extract removed through these conduits will be separately distilled in a fractionating still similar to 36 shown in Figure 1 to separate the extracted compounds from the solvent. These additional stills have been omitted from the flow sheet for the sake of simplicity.

By controlling the conditions of extraction in the various stages it is possible to obtain an extract from treater 7 which is substantially free from sulfur compounds and which is predominantly or entirely aromatic in chemical constitution. Likewise, by proper control an extract cut from treater 9 which contains a high proportion of sulfur bodies present in the petroleum and an extract cut from treater 11 which is predominantly naphthenic in character may be obtained. In order to obtain these results it is of course necessary to maintain the temperature in treater 7 above the boiling point of the sulfur bodies, naphthenic compounds and paraffinic compounds in the petroleum, but within the range at which aromatic compounds are preferentially extracted by the selective solvent. In a similar manner the temperature in extractor 9 will be above the boiling point of the naphthenes and paraffins, but within the range at which sulfur compounds are preferentially dissolved by the selective solvent. In treater 11 the temperature will be sufficiently high to cause vaporization of the paraffinic compounds and yet within the range at which naphthenes will be extracted by the selective solvent. Obviously, the specific temperatures, pressures and solvent-to-oil ratio necessary to produce these results will vary with the selective solvent being used and with the petroleum stock being treated. With a given solvent and a given stock the proper conditions can be readily determined by experiment.

In view of the above discussion it is apparent that by the process represented in the flow sheet of Fig. 1 a petroleum fraction can be continuously separated into four separate fractions of distinctly different chemical constitution by passing the petroleum fraction through a series of three or more extraction zones, passing a liquid phase selective solvent through each of said extraction zones, intimately contacting the petroleum and the selective solvent in said extracting zones, maintaining said selective solvent in each of the zones at a temperature no lower than the boiling point of the petroleum fraction under the conditions of extraction in that zone, maintaining the temperature of the solvent above the boiling point of the non-aromatic compounds in the first zone of extraction but below the point at which all aromatic compounds would be vaporized from the solvent, maintaining the temperature of the solvent in the second extracting zone above the boiling point of the paraffinic and naphthenic compounds but below the point at which all sulfur bodies would be vaporized from the selective solvent and maintaining the temperature of the solvent in a third extraction zone above the boiling point of the paraffinic compounds, but within the range at which substantially all the cyclic non-benzenoid compounds are selectively dissolved. The paraffinic compounds will then be removed in vapor phase from the third extraction zone and aromatics, sulfur bodies and naphthene compounds in the extracts from extraction zones 1, 2 and 3, respectively.

An added refinement which may be utilized in the process illustrated by Fig. 1 comprises operating extraction towers 7, 9 and 11 at successively decreased temperatures and pressures. In this species of operation extractor 7 will be maintained at substantially atmospheric pressures, for example, extractor 9 at an intermediate reduced pressure and extractor 11 at the lowest pressure and highest vacuum. Vacuum can be produced by the use of condenser 19 and pump 45 or by other suitable and well-known arrangements of apparatus. Throttle valves 43 and 44 in vapor lines 8 and 10 respectively are utilized to effect a pressure differential between extractors 9 and 11. Pumps 46 and 47 in lines 27 and 23 serve to feed the solvent from the zones of lower pressure to the zones of successively higher pressures. Pump 48 is provided in the reflux line to extractor 9 to feed the reflux from line 16 to extractor 9. This pump is necessary when as in the case of the present species of operation extractor 9 is operated at higher pressures than extractor 11.

By utilizing successively higher vacuum, that is successively reduced vapor pressures in the successive stages of extraction, improved separation of aromatics from paraffins and greater efficiency of operation may be obtained.

Figure 2:
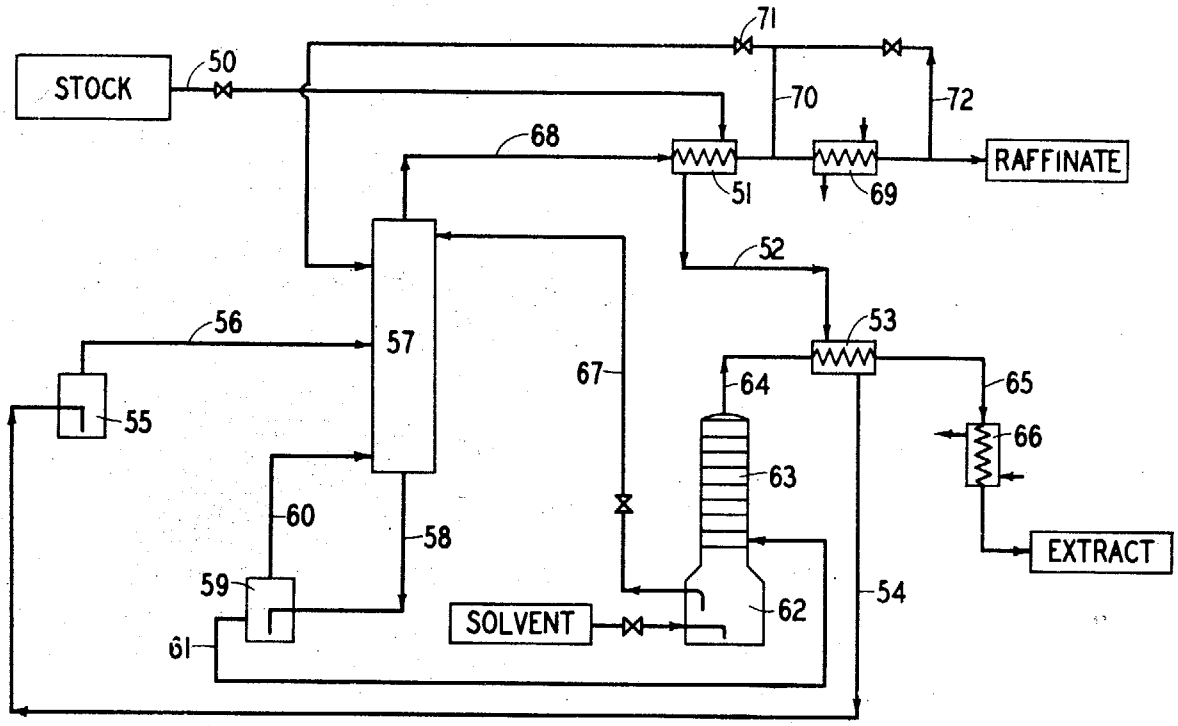
Fig. 2 is a diagrammatic illustration of a process utilizing a single stage vapor phase contacting tower for carrying out the selective solvent extraction process of this invention.

The flow sheet of Fig. 2 illustrates an alternative simple but very effective method for operating the process of this invention. In this arrangement petroleum stock to be treated passes from storage through valve controlled line 50, heat exchanger 51, line 52, heat exchanger 53, line 54, vaporizer 55, and line 56 to a single extraction tower 57. The liquid phase selective solvent together with its dissolved extract flows from the bottom of tower 57 through line 58 to vaporizer 59. A portion only of the extract is flashed into vapor form and re-circulated through line 60 to tower 57. Solvent is continuously removed from vaporizer 59 through line 61 and passed to still 62 for removal of the extracted hydrocarbons. The extract is separated from the solvent in fractionating column 63 and flows through line 64, heat exchanger 53, line 65 and condenser 66 to storage. The selective solvent is continuously removed from the still and recirculated to extraction tower 57 through valve controlled line 67. The liquid level in the vaporizers 55, 59 and 62 is maintained above the conduit connections 54, 58, 61 and 67 to produce a liquid seal and prevent the flow of vapors through these conduits.

Raffinate vapors flow from the top of extraction tower 57 through line 68 to heat exchanger 51 where partial condensation occurs. As much of this partial condensate as is desired may be returned to the extraction tower through line 70 controlled by valve 71. The remainder of the raffinate passes through condenser 69 to storage. Valve controlled conduit 72 provides means for supplying additional condensate to the reflux line when the desired reflux ratio is higher than that obtainable with the partial condensate alone.

In a single stage extraction process it is essential that the vapor phase hydrocarbons and liquid phase solvent be intimately contacted. One efficient means for effecting this result comprises the conventional bubble cap fractionating column in which the vapors to be extracted rise upwardly through a series of bubble caps and are thereby intimately mixed with the downflowing extracting solvent. Such an extraction tower is the preferred form utilized in the process of both Figs. 1 and 2.

To illustrate the characteristics of the process the following data are given:

A natural petroleum cut having a boiling range of 200° to 300° F. was extracted in a single bubble cap tower with an arrangement of apparatus similar to that illustrated diagrammatically in Fig. 2. The data of a typical run using crude xylenols which had been topped at 450° F., as the selective solvent are given below:

| | |
|---|---|
| Rate of petroleum feed | 5 cc./min. |
| Rate of solvent feed | 25 cc./min. |
| Temperature at base of extraction column | 288° F. |
| Temperature of raffinate vapor | 216° F. |
| Temperature of still | 490° F. |
| Temperature of extract vapor from stripping column | 249° F. |
| Temperature of solvent entering extraction column | 254° F. |
| Temperature of stock entering column | 245° F. |
| Reflux ratio of raffinate | 1.9 |
| Extract yield | 38% |
| Aniline point of stock fed | 44.4° F. |
| Aniline point of raffinate | 85° F. |
| Aniline point of extract | —15° F. |

In this run the temperatures of feed and selective solvent were 5° to 10°, and 10° to 20°, respectively, above the dew point of the stock.

A series of tests was run to determine the effect of reflux of the raffinate on the aniline point spread and yield of extract. Two series of data were obtained, one for a solvent thinner ratio of five to one, and one for a ratio of one to one. The extract yield was held constant to 40% and the other variables, such as temperature, as close to those values given above as possible. The reflux ratio was varied during these tests to determine the effects on the aniline points of the raffinate and extract. It was found that the optimum reflux ratio is zero. At that ratio the aniline point of the extract is as low as can be obtained with that particular extract yield and solvent stock ratio. The lower the yield, of course, the lower the aniline point of the extract.

When the optimum reflux ratio of zero is used, it was found that the optimum ratio of solvent to petroleum was approximately three to one. Increased ratios up to as high as five to one give appreciable benefits in the extraction process. The increased efficiency of extraction which results from solvent ratios above five to one are relatively small.

In an arrangement of apparatus such as shown in Fig. 2 where the still 62 is separated from the extraction column by liquid seals so that extract vapors cannot return to the extraction column, it was found that the optimum ratio of solvent to petroleum was approximately 2:1.

It has also been found that with various selective solvents, such as xylenol, the extraction process is selective with respect to raffinate hydrocarbons having a boiling point as much as 60° F. above the boiling point of the aromatic hydrocarbons being extracted. In ordinary selective solvent liquid phase extraction processes, selectivity decreases with increase in temperature. At temperatures of 400 to 500° F., such as are involved in the process of this invention, selective solvents have heretofore been regarded as entirely ineffective since they dissolve the raffinate hydrocarbons practically as readily as the extract hydrocarbons obtained at lower temperatures. Also, it is a generally accepted principle that as between two solutes dissolved in a given solvent, the higher the boiling point of a given solute the less is its tendency to vaporize from the solution. That is, the lowest boiling dissolved hydrocarbon components should most readily vaporize from the solvent and the higher boiling hydrocarbons (such as the raffinate hydrocarbons boiling 60° above the extract hydrocarbons in the present process) should tend to dissolve and remain in solution. Certainly it is not obvious that the much more volatile constituents would be selectively dissolved at the high temperatures involved and that the less volatile raffinate hydrocarbons having a boiling point 20 to 60° higher than that of the extract hydrocarbons would be almost quantitatively separated as a vapor phase.

There is, of course, a practical limit to the range of boiling point spread between the extract and raffinate hydrocarbons which is permissible if pure aromatics are to be obtained by selective solvent extraction in the vapor phase. When paraffinic and aromatic hydrocarbons are being separated, those paraffinic hydrocarbons having a boiling point more than 100° F. above the boiling point of the aromatics are dissolved in the solvent and will be removed with the extract in a vapor phase extraction process. Paraffine hydrocarbons having boiling points 20° to 60° F. above the boiling point of the aromatics being extracted can, on the other hand, be effectively separated as raffinate vapors. Paraffine hydrocarbons having boiling points equal to or lower than the aromatics being extracted present no difficulty whatever since they are readily separated in the vapor phase. In other words, when the paraffinic and naphthenic compounds present in the petroleum cut have boiling points no more than 60° F. above the lowest boiling aromatic which is extracted, an extract free from these higher boiling compounds can be produced.

Table No. 1 illustrates results obtained with different solvents in treatments on different types of petroleum oils.

Table 1

| Solvent | Natural petroleum stock treated | Stock aniline point, ° F. | Extract yield, percent | Extract aniline point*, ° F. | Raffinate aniline point, ° F. | Solvent to stock ratio | Raffinate reflux ratio |
|---|---|---|---|---|---|---|---|
| Phenol | 200–300° F. cut Calif. crude | 44.3 | 40 | −44.4 | 116.2 | 5.6 | 1 |
| Do | do | 44.3 | 18 | −75.4 | 81.8 | 5.6 | 1 |
| Do | do | 44.3 | 50 | −20.4 | 114.4 | 5.6 | 1 |
| Crude xylenol topped to 450° F | 300–400° F. cut Calif. crude | 42.5 | 19 | +11.6 | 44 | 5 | 1 |
| Do | 300–350° F. cut Calif. crude | 30.4 | 26 | −15.2 | 47.6 | 5 | 1 |
| Do | 200–300° F. cut Calif. crude | 44.4 | 40 | −27 | 76 | 5 | 0 |
| Triethylene glycol | 200–300° F. cut Calif. crude | 44.4 | 39 | −40.4 | 102.8 | 5 | 0.0 |
| Do | 200–300° F. cut Calif. crude | 44.4 | 39 | −30.8 | 95.4 | 5.0 | **1.9 |

*All aniline points were determined by the equal volume method or by refractive index.
**Apparatus provided with liquid seal between extraction and extract stripper columns.

*Referring to this table, it will be noted that an aromatic product having an aniline point of −75.4° F. was produced from a 200–300° F. cut from a California crude, the aniline point of the stock being 44.3 under conditions wherein phenol was employed as the selective solvent and the yield of extract held to 18%. Aniline point is a well-known measure of aromatic content, and the low aniline point of −75.4° F. is indicative of the purity of the product respecting relative absence of non-aromatic materia.*

A selective solvent useful for the present process should be highly selective and should have a boiling point well above the end point of the stock to be treated. A boiling point above approximately 300° F. will generally be found desirable for extraction of normally liquid low boiling hydrocarbons. Preferably the solvent should not form constant boiling mixtures with hydrocarbons, but if such constant boiling point mixtures are formed, the solubility characteristics of the solvent should be such that complete recovery by water extraction is possible. Constant boiling mixtures of the solvent with water should not be formed or additional complications will result from the use of water in solvent recovery. Various solvents with the above desired properties have been found and are listed in Table No. 2.

In order to test the relative selectivity of solvents a simple comparative test was adopted. This test consisted of adding a petroleum cut having a boiling point of from 215 to 240° F. to 150 cc. of the solvent. The petroleum was added slowly and with constant stirring so that the solvent could be maintained at 250° F. during the test. A portion of the dissolved petroleum was vaporized from the mixture at this temperature and the first 3 cc. of overhead were taken for an aniline point test. The elevation of this aniline point over that of the original stock is designated "selectivity".

Table No. 2 lists the solvents tested in the order of their selectivity as determined by this method. Solvents having a selectivity factor greater than 25 are operative in the vapor phase extraction process of this invention providing they also have a boiling point substantially above the dew point of the hydrocarbon fraction being extracted. Attention is directed to the fact that this test merely indicates the relative selectivity of the solvents and that much greater aniline point spreads are obtained by the actual process of this invention. For example, xylenol has a selectivity of 32.1 as determined by the test but gave an aniline point spread of 103° F. between the extract and raffinate when used to treat a 200 to 300° F. boiling point petroleum cut (see Table 1).

Table 2

| Solvent | B. P., °F. | Selectivity | Solubility* |
|---|---|---|---|
| Resorcinol | 529 | 60.2 | 35 |
| Diacetin | 349 at 40 mm | 60 | 40 |
| Tetraethylene glycol | 293 at 0.1 mm | 56 | 30 |
| Phenol | 360 | 55.1 | 80 |
| Triethylene glycol | 550 | 55 | 26 |
| Tetramine | 511 | 54.3 | 48 |
| Anisidine | 435-484 | 51.3 | 80 |
| Diethylene glycol | 472 | 51.1 | 20 |
| "Carbitol" | 396 | 50.0 | 53 |
| Acetamide | 432 | 49.8 | 22 |
| Triacetin | 498 | 47.7 | 90 |
| Xylidine | 412-439 | 46.3 | 74 |
| Acetanilide | 579 | 45.8 | 80 |
| Diethanolamine | 514 | 43.9 | 15 |
| Nitrobenzene | 412 | 42.8 | 170 |
| Aniline | 361 | 42.4 | 140 |
| "Chlorex" | 352 | 39.7 | 166 |
| Diaminopropanol | 246 at 4 mm | 39.7 | 15 |
| Tricresyl phosphate | 507 at 20 mm | 38.9 | 95 |
| Benzaldehyde | 355 | 38.2 | 162 |
| Triethanolamine | 531 at 150 mm | 36.5 | 15 |
| Eugenol | 487 | 36.4 | 94 |
| Diphenyl amine | 576 | 34.6 | 185 |
| Acetophenone | 396 | 34.4 | 150 |
| Xylenol | 450 | 32.1 | 140 |
| "Carbitol" acetate | 424 | 32.1 | 168 |
| Butyl carbitol | 448 | 29.9 | 130 |
| Phenetidine | 444-489 | 29.5 | 205 |
| Dibutyl phthalate | 410 at 20 mm | 27.6 | 140 |

*Number of cc. of 215-240° F. straight run petroleum cut dissolved by 150 cc. of solvent at 250° F. and one atmosphere total absolute pressure.

Tetraethylene glycol and triethylene glycol have selectivity factors of 56.7 and 55 respectively. These solvents also have very high boiling points and are highly efficient selective solvents for vapor phase extraction.

Triethylene glycol is a preferred selective solvent for the present process. It has a very high selectivity, is stable, non-corrosive and has the very high boiling point of 550° F. The high selectivity of this compound is illustrated by a run in which a petroleum stock having a boiling point range of from 200° to 300° F. was treated and an extract produced having an aniline point of −40° F. The spread of aniline point between the raffinate and the extract was 143.2° as compared with 103° with xylenol under the same conditions. Even with a 300° to 400° boiling range petroleum cut, which necessitated extraction at much higher temperatures than with the 200° to 300° cut, a −24° F. aniline extract was produced and a total spread of aniline point between raffinate and extract of 104.2° obtained.

In a six hour test at 550° F., the maximum decomposition of the triethylene glycol was a change of 0.1% determined from boiling point curves taken before and after the test. Other tests failed to show any decomposition of the triethylene glycol. The maximum corrosion observed on iron or steel was 0.008 inch per year at 550° F.

In a long run using the type of apparatus illustrated by Fig. 2, it was found that a small amount of trietrylene glycol distilled over with the extract and raffinate fractions. The amount of triethylene glycol dissolved in the extract portion of the hydrocarbons was of the order of 0.15% by volume. This small amount of triethylene glycol is easily and completely removed by water washing and the solvent can then be recovered by the evaporation of the water therefrom.

A more advantageous method for recovering the solvent from the wash water is to feed the water containing the solvent into the still and fractionating column along with the extract layer. This method has the advantage that it breaks up the constant boiling mixtures of solvents and high boiling extracts which may tend to form. The water and hydrocarbon extract come over as overhead and are readily separated. In those cases where there has been incomplete removal of water from the selective solvent, the effect is merely to render the solvent more selective in the extraction step of the process. That is, the aniline point of the extract is lower and the yield of aromatic hydrocarbons decreased.

As stated above, simple water washing completely removes even very minute amounts of triethylene glycol which may be dissolved in the petroleum. For example, it has been found that when a 300 to 400° cut of petroleum is contacted with a water solution containing 20% by weight of triethylene glycol, no detectable amount of triethylene glycol can be found in the petroleum layer. These data indicate that triethylene glycol has a very high partition coefficient between petroleum and water so that this solvent readily diffuses almost quantitatively from oil to water.

Tetramine constitutes an additional example of a selective solvent which is very efficient in the process of this invention. This compound is one of a generic group which may be represented by the general formula $$NH_2 \cdot C_2H_4 \cdot (C_2H_4 \cdot NH)_x \cdot NH_2$$

or $$\left[-(C_2H_4 \cdot NH)_x \cdot C_2H_4 \cdot NH-\right]$$

The first formula is an open chain compound exemplified by

Diethylene triamine
($NH_2 \cdot C_2H_4 \cdot NH \cdot C_2H_4 \cdot NH_2$)
Triethylene tetramine
($NH_2 \cdot C_2H_4 \cdot NH \cdot C_2H_4 \cdot NH \cdot C_2H_4 \cdot NH_2$)
and tetraethylene pentamine
($NH_2 \cdot C_2H_4 \cdot NH \cdot C_2H_4 \cdot NH \cdot C_2H_4 \cdot NH \cdot C_2H_4 \cdot NH_2$)

Examples of the second generic formula, which are ring compounds, are

Diethylene diamine

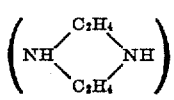

and triethylene triamine

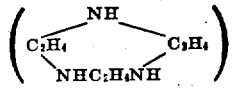

It will be noted that these compounds are characterized in that they contain more carbon than nitrogen atoms in their molecules and can be formed by the inter-action of ethylene dichloride with ammonia followed by liberation of free amine by treatment with caustic. These compounds which have a boiling point above 300° F. are in general eminently suited for use as selective solvents in the process of this invention.

Although a number of specific examples of suitable selective solvents have been given and although triethylene glycol is at present the preferred solvent for the process of this invention, it should be apparent to those skilled in the art that the broader aspects of the invention include the use of a multitude of other selective solvents. High boiling hydroxy ethers, illustrated by diethylene glycol, triethylene glycol and tetraethylene glycol, comprise one chemical type of selective solvent most suitable for the process herein disclosed. High boiling hydroxy esters, illustrated by diacetin, dibutyl tartrate, and butyl lactate, are also suitable. "Carbitol" acetate and butyl "Carbitol" illustrate operative compounds containing hydroxy, ether and ester groups.

Experiments indicate that polar compounds selected from the group consisting of hydroxy benzenes, amines, amides, chlorinated hydrocarbons, esters of polycarboxylic acids, and phosphoric acid esters of hydroxy benzenes are in general operative in the process of this invention. As previously pointed out the solvent selected from this group should have a boiling point sufficiently high so that it can be readily maintained in liquid phase under the conditions of extraction. In general, a boiling point above approximately 300° F. is desirable.

While the character of this invention has been described in detail and numerous illustrative examples given, this has been done by way of illustration only and with the intention that no limitation should be imposed upon the invention thereby. It will be apparent to those skilled in the art that numerous modifications and variations may be effected in the practice of our invention which is of the scope of the claims appended hereto.

We claim:

1. A process of treating a petroleum fraction with a selective solvent which comprises passing a petroleum fraction containing aromatic, cyclic non-benzenoid and paraffinic compounds through a series of extraction zones, passing a high boiling liquid phase selective solvent through each of said extraction zones at a temperature substantially below its boiling point, intimately contacting the petroleum and the selective solvent in said zones, maintaining the selective solvent at a temperature no lower than the boiling point of the petroleum fraction under the conditions of extraction, maintaining the temperature of said solvent above the boiling point of the non-aromatic compounds in the first zone of extraction and selectively dissolving aromatics in said solvent, maintaining the temperature of said solvent in a second extracting zone above the boiling point of the paraffinic compounds and selectively dissolving cyclic non-benzenoid compounds in the solvent, and removing paraffinic compounds in vapor phase from the last of said extraction zones.

2. A process of treating a petroleum to selectively extract carbocyclic non-paraffinic hydrocarbons therefrom which comprises passing said petroleum through successive extraction zones, passing a liquid phase selective solvent countercurrently to said petroleum through each of said extraction zones, maintaining the selective solvent in liquid phase and at a temperature above the initial boiling point of the petroleum fraction under the conditions of extraction, intimately contacting the petroleum and selective solvent in said zones and maintaining the vapor pressure in at least one of said extraction zones below that of the extraction zone in which the petroleum is first contacted with the selective solvent.

3. A process of treating petroleum to selectively extract non-paraffinic hydrocarbons therefrom which comprises passing said petroleum through a series of extraction zones, passing a liquid phase selective solvent countercurrently through said zone, intimately contacting the petroleum and selective solvent in each of said extraction zones, successively decreasing the vapor pressure in said series of zones from a region of highest pressure at the petroleum inlet zone to a region of lowest pressure at the petroleum outlet zone, and maintaining the temperature of said liquid phase selective solvent in each of said zones above the boiling point of the petroleum at the pressure of extraction in that zone but substantially below the boiling point of the selective solvent.

4. A process which comprises extracting a petroleum fraction with triethylene glycol, separating an extract phase and a raffinate phase, vaporizing dissolved hydrocarbons from said extract phase, and adding water to said extract vaporizer to inhibit formation of constant boiling mixtures of said triethylene glycol and dissolved hydrocarbons in said extract.

5. In a process of treating a hydrocarbon mixture with a selective solvent to selectively extract carbocyclic non-paraffinic hydrocarbons therefrom, the steps which comprise passing into an extraction zone a normally liquid hydrocarbon fraction containing a mixture of carbocyclic and paraffinic hydrocarbons in which the least volatile paraffinic hydrocarbon normally boils from approximately 20° to 60° F. above the normal boiling point of the most volatile carbocyclic non-paraffinic hydrocarbon in said mixture, passing a liquid phase selective solvent through said extraction zone, intimately contacting said hydrocarbon fraction in vapor phase with said liquid phase selective solvent, separating a vapor phase hydrocarbon raffinate from said liquid phase selective solvent, maintaining said selective solvent at said point of separation above the intial boiling point but no more than approximately 20° F. above the dew point of said hydrocarbon fraction under the conditions of extraction, passing the liquid phase selective solvent containing carbocyclic non-paraffinic hydrocarbons from said extraction zone to an independent distillation zone, condensing said vapor phase hydrocarbon raffinate, and returning to said extraction zone approximately two-thirds of said condensed raffinate.

*6. In a process of treating a hydrocarbon petroleum mixture with a selective solvent to selectively extract carbocyclic non-paraffinic aromatic hydrocarbons therefrom, the steps which comprise passing into an extraction zone at an intermediate point thereof a normally*

*liquid hydrocarbon petroleum fraction containing a mixture of carbocyclic and paraffinic hydrocarbons including aromatic hydrocarbons in which the least volatile paraffinic hydrocarbon normally boils from approximately 20° to 60° F. above the normal boiling point of the most volatile carbocyclic non-paraffinic aromatic hydrocarbon in said mixture whereby an extract free from these higher boiling compounds can be produced, passing a liquid phase selective solvent downwardly through said extraction zone, intimately contacting said hydrocarbon petroleum fraction in vapor phase with said liquid phase selective solvent, separating a vapor phase hydrocarbon raffinate from said liquid phase selective solvent as a top product from said zone, maintaining said selective solvent at said point of separation above the initial boiling point but no more than approximately 20° F. above the dew point of said hydrocarbon fraction under the conditions of extraction, passing the liquid phase selective solvent containing carbocyclic non-paraffinic aromatic hydrocarbons from said extraction zone to an independent distillation zone, condensing said vapor phase hydrocarbon raffinate, and returning to the upper portion of said extraction zone approximately two-thirds of said condensed raffinate.*

*7. A process as set forth in claim 6, wherein the least volatile paraffinic hydrocarbon normally boils approximately 20° F. above the normal boiling point of the most volatile carbocyclic non-paraffinic aromatic hydrocarbon in said petroleum fraction.*

*8. A process as set forth in claim 7, wherein the least volatile paraffinic hydrocarbon normally boils approximately 60° F. above the normal boiling point of the most volatile carbocyclic non-paraffinic aromatic hydrocarbon in said petroleum fraction.*

CALIFORNIA RESEARCH CORPORATION,

By L. P. ELLIOTT,
*Vice-President.*

No references cited.